United States Patent
Gast et al.

(10) Patent No.: US 6,508,076 B1
(45) Date of Patent: Jan. 21, 2003

(54) DUCT SYSTEM FOR TEMPERATURE-CONTROLLED CARGO CONTAINERS

(75) Inventors: Randal Gast, Chaska, MN (US); David B. Ziegler, Eden Prairie, MN (US); Doug Lenz, Savage, MN (US); Ming Zhang, Apple Valley, MN (US); Verlin Wirth, Apple Valley, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 09/651,662

(22) Filed: Aug. 29, 2000

Related U.S. Application Data (60) Provisional application No. 60/180,068, filed on Feb. 3, 2000.

(51) Int. Cl.[7] .............................. F25D 17/04; B60H 1/32
(52) U.S. Cl. .............................. 62/408; 62/404; 62/239; 62/89; 454/137
(58) Field of Search .............................. 62/89, 408, 404, 62/120, 93, 239; 454/88, 90, 89, 118, 136, 137, 83

(56) References Cited

U.S. PATENT DOCUMENTS

| | | | |
|---|---|---|---|
| 941,443 A | 11/1909 | Faget | |
| 1,298,655 A | 4/1919 | Briner | |
| 1,506,904 A | 9/1924 | Harrison | |
| 1,847,861 A | 3/1932 | Bradbury | |
| 2,423,241 A | 7/1947 | Kurth et al. | 98/40 |
| 2,821,029 A | 1/1958 | Simons | 34/34 |
| 3,699,870 A | 10/1972 | Cantagallo et al. | 98/10 |
| 3,792,595 A | 2/1974 | Willis | |
| 3,899,823 A | 8/1975 | Lambert | 29/455 |
| 3,922,959 A | 12/1975 | Treffers | 98/40 |
| 3,942,419 A | 3/1976 | Beach | 98/40 |
| 3,949,522 A | 4/1976 | Kehl et al. | 47/17 |
| 3,988,973 A | 11/1976 | Honmann | 98/40 |
| 3,992,892 A | * 11/1976 | Sain et al. | 62/93 |
| 4,362,091 A | 12/1982 | Cox | 98/40 |
| 4,432,213 A | 2/1984 | Katahira et al. | 62/239 |
| 4,441,402 A | 4/1984 | Harris | |
| 4,448,041 A | 5/1984 | Southworth, Jr. | |
| 4,531,377 A | 7/1985 | Zajic | |
| 4,531,573 A | 7/1985 | Clark et al. | |
| 4,553,403 A | 11/1985 | Taylor | |
| 4,565,071 A | 1/1986 | Bartling et al. | |
| 4,726,196 A | 2/1988 | Zajic | |

(List continued on next page.)

FOREIGN PATENT DOCUMENTS

JP  11201618 A  *  7/1999

OTHER PUBLICATIONS

A description of "A Patented Refrigerated Air Supply Control Delivery System for Road Transportation" dated Sep. 24, 1999.
A letter to Mr. Randall Gast dated Aug. 22, 2000 describing an airflow system.
A letter to Mr. Bud Rodowick describing and showing the "Uni–Flow Side Mount Air Ducts" shown in the Nov. 1991 issue of "Refrigerated Transporter".
An advertisement published in the Nov. 1991 issue of "Refrigerated Transporter" showing "Uni–Flow Side Mount Air Ducts."

*Primary Examiner*—Chen-Wen Jiang
(74) *Attorney, Agent, or Firm*—Michael Best & Friedrich LLP (57) ABSTRACT

A removable modular duct system for conducting air in a temperature-controlled cargo container. Temperature-controlled air produced and propelled by a refrigeration unit, is conducted along the modular duct system by one or more duct sections and a transition section that conducts air from the refrigeration unit to the duct sections. The air may be discharged laterally via lateral discharge openings in the duct sections. An end section may be coupled to the duct sections to discharge air at the end of the duct system.

39 Claims, 13 Drawing Sheets

U.S. PATENT DOCUMENTS

| | | | |
|---|---|---|---|
| 4,744,225 A | 5/1988 | Shoji et al. | |
| 4,800,733 A | 1/1989 | Strobel et al. | |
| 4,887,437 A | * 12/1989 | Fenton et al. | 62/408 X |
| 4,951,479 A | * 8/1990 | Araquistain et al. | 62/239 |
| 4,979,431 A | 12/1990 | Fujimoto et al. | 98/6 |
| 5,044,259 A | 9/1991 | Catan et al. | 98/40.19 |
| 5,054,295 A | 10/1991 | Goulooze | |
| 5,111,739 A | 5/1992 | Hall | 454/306 |
| 5,129,235 A | 7/1992 | Renken et al. | |
| 5,161,848 A | 11/1992 | Lutton | |
| 5,187,945 A | 2/1993 | Dixon | |
| 5,295,905 A | 3/1994 | Simble | 454/286 |
| 5,315,846 A | 5/1994 | Lee | 62/419 |
| 5,319,941 A | 6/1994 | Schilling | |
| 5,407,002 A | 4/1995 | Voll | |
| 5,415,009 A | 5/1995 | Weiner et al. | 62/239 |
| 5,518,448 A | 5/1996 | Madoglio et al. | 454/108 |
| 5,660,584 A | * 8/1997 | Serrano | 454/137 X |
| 5,704,676 A | 1/1998 | Hill | |
| 5,809,798 A | * 9/1998 | Clarke et al. | 62/408 |
| 5,830,057 A | 11/1998 | Hunt, Jr. | |
| 5,946,933 A | 9/1999 | Clarke et al. | |
| 6,016,664 A | 1/2000 | Larsson et al. | |
| 6,164,085 A | * 12/2000 | Clarke et al. | |

\* cited by examiner

DUCT SYSTEM FOR TEMPERATURE-CONTROLLED CARGO CONTAINERS

RELATED APPLICATIONS

This application claims priority from U.S. Provisional Application Serial No. 60/180,068, filed Feb. 3, 2000, which is incorporated herein by reference.

TECHNICAL FIELD

This invention relates to systems for movement of temperature-controlled air, and more particularly to duct systems for movement of air inside temperature-controlled cargo containers.

BACKGROUND

Trucks, trains and other carriers hauling temperature-controlled cargo containers transport perishable products around the country every day. Refrigeration of a temperature-controlled cargo container involves distributing temperature-controlled air, typically cool or cold air, within the enclosure of the container. A refrigeration unit is used to adjust and control the temperature of the air drawn from the outside environment or from inside the enclosure. This temperature-controlled air is then distributed throughout the enclosure.

Ordinarily only a single refrigeration unit is employed with a single cargo container. The temperature-controlled air ordinarily must be directed from the refrigeration unit to other locations inside the enclosure. Such direction promotes proper circulation of air, which helps create and maintain the desired uniform temperature inside the enclosure.

In the context of a trailer or a railroad car, the cargo container is usually in the shape of an elongated box, with a refrigeration unit mounted at one end. To move temperature-controlled air around the container, a system of channels may be employed to conduct the temperature-controlled air to the end of the container farthest from the refrigeration unit. Other channels can direct the air to the middle sections of the container and around the sides. The channels are often placed above the cargo and distribute the air near the ceiling of the container. Distribution of cool air near the ceiling will enhance air circulation because cooler air is more dense than warmer air and tends to sink to the floor.

Cloth or canvas chutes have been employed in the past to direct airflow. Cloth and canvas chutes are relatively inexpensive, but they suffer from several disadvantages. First, if a chute is damaged, the entire chute must ordinarily be replaced. Even if the damage is repairable, the entire chute must ordinarily be removed from the temperature-controlled cargo container for repair. Second, chutes are difficult to clean, and because refrigerated cargo often includes food products, cleanliness is important. Third, chutes are not easily adjustable to direct air to particular areas within the container, such as the sides of the container. Fourth, chutes tend to wrinkle and flap, restricting air flow and hampering air distribution. Fifth, it is difficult and time-consuming for one person to install a chute, in part because the chute must be installed with a proper amount of sag along its length to create an airflow channel.

SUMMARY

The invention provides a modular duct system for conducting air in a temperature-controlled cargo container. Temperature-controlled air produced and propelled by a refrigeration unit is conducted along the modular duct system by one or more duct sections and a transition section that conducts air from the refrigeration unit to the duct sections. An end section may be coupled to the duct sections. Individually adjustable discharge openings allow the air to be discharged to the sides and the rear of the temperature-controlled cargo container. The invention further provides a method for directing temperature-controlled air in a temperature-controlled cargo container using a modular duct system installed along the ceiling of the temperature-controlled cargo container. The invention also provides a method of installation of such a modular duct system.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is a perspective view of a duct section .

FIG. 7 is a perspective view of an end section.

Like reference symbols in the various drawings indicate like elements.

DETAILED DESCRIPTION

Figure 1:
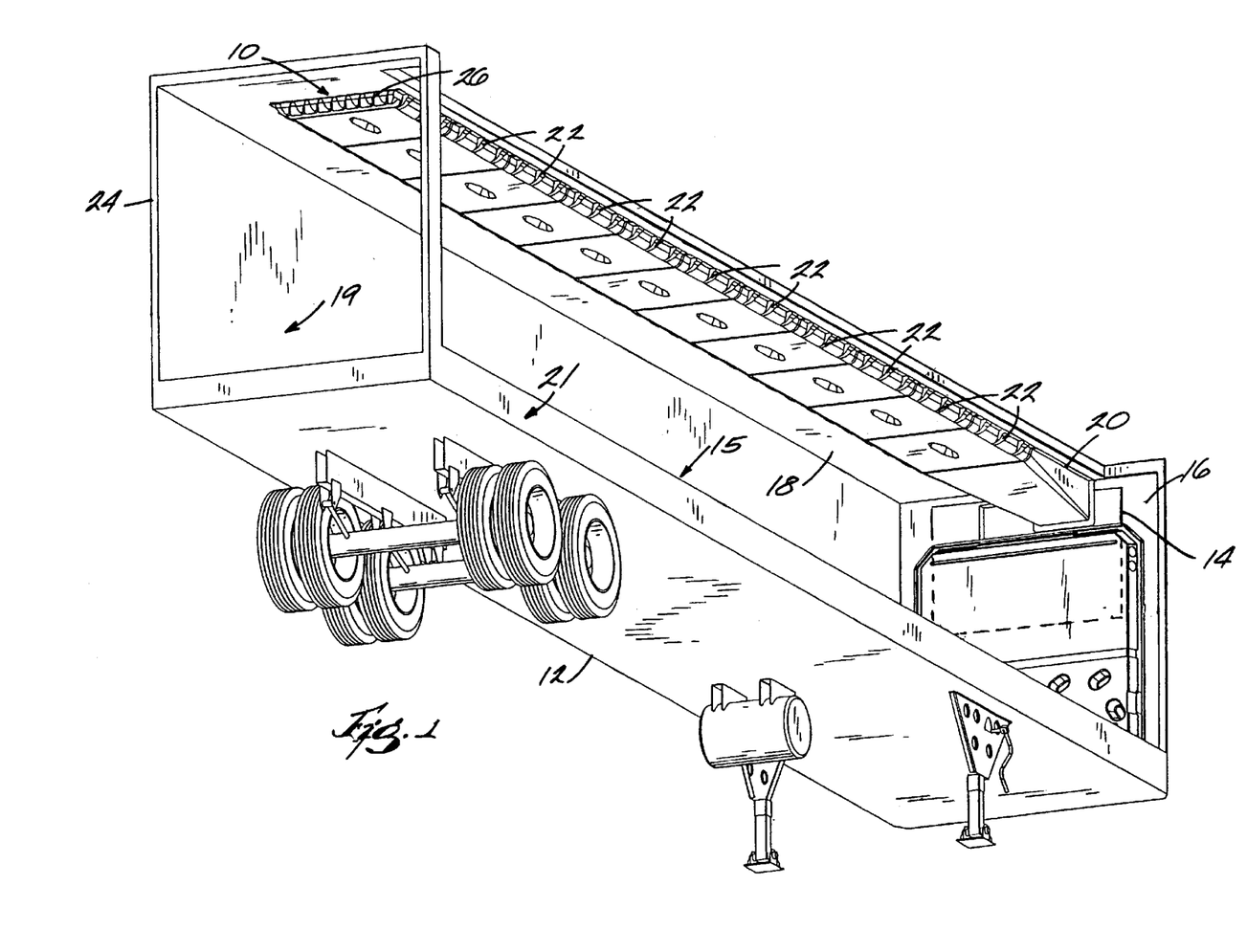
FIG. 1 is a perspective view of an embodiment of the invention.

FIG. 1 depicts a perspective view of an embodiment of the invention. FIG. 1 shows a duct system 10 installed in the enclosure of a temperature-controlled cargo container. The temperature-controlled cargo container is a semi trailer 12, but the invention is not limited to use in trailers. The invention can be implemented in a temperature-controlled cargo container of any shape. A temperature-controlled cargo container such as trailer 12 or a railroad car defines an enclosure for holding cargo that typically includes a floor 15, a ceiling 18, a pair of ends 16, 24 generally perpendicular to the floor and ceiling, and a pair of sides 19, 21 generally perpendicular to the floor, ceiling and ends.

Trailer 12 includes a refrigeration unit 14 that controls the temperature of the air in the enclosure. Refrigeration unit 14 also includes an apparatus such as a fan or blower to blow the temperature-controlled air into trailer 12. The position of refrigeration unit 14 relative to trailer 12 as shown in FIG. 1 is typical, with refrigeration unit 14 mounted at the front end 16 of an elongated container. In the absence of measures to distribute the temperature-controlled air, the air inside trailer 12 will not be at a uniform temperature. The lack of temperature uniformity will be especially pronounced when trailer 12 is loaded with cargo.

The temperature-controlled air produced by refrigeration unit 14 is distributed throughout the enclosure by duct system 10. Duct system 10 is mounted to the ceiling 18 of trailer 12 and is further mounted near the midline of the ceiling 18, making duct system 10 approximately equidistant from sides 19 and 21. Duct system 10 is formed from three basic kinds of modules. The first module is a transition section 20, which is coupled to refrigeration unit 14. Transition section 20 serves as an adapter between refrigeration unit 14 and the rest of duct system 10. Transition section 20 conducts air from refrigeration unit 14 to one or more duct sections 22, which further conduct and direct the flow of air. Duct sections 22 are the second kind of module. Ten duct sections 22 are depicted in FIG. 1, cooperating to conduct air toward the back end 24 of trailer 12. Duct section 22 further distribute air toward the sides of trailer 12. The third kind of module is an end section 26. End section 26 is configured to conduct air from the refrigeration unit 14 by way of transition section 20 and duct sections 22, and to discharge the air into trailer 12. The sections of duct system 10 need not be coupled together with airtight seals.

Transition section 20, duct section 22, end section 26 and end adapter 140 may be constructed of lightweight material that is resistant to cold, i.e., material that will not become brittle in cold temperatures. Many types of stiff plastic may work well in a cold environment, and plastic has many advantages. Plastic is lightweight, durable, easy to clean, and can be easily molded.

Figure 2:
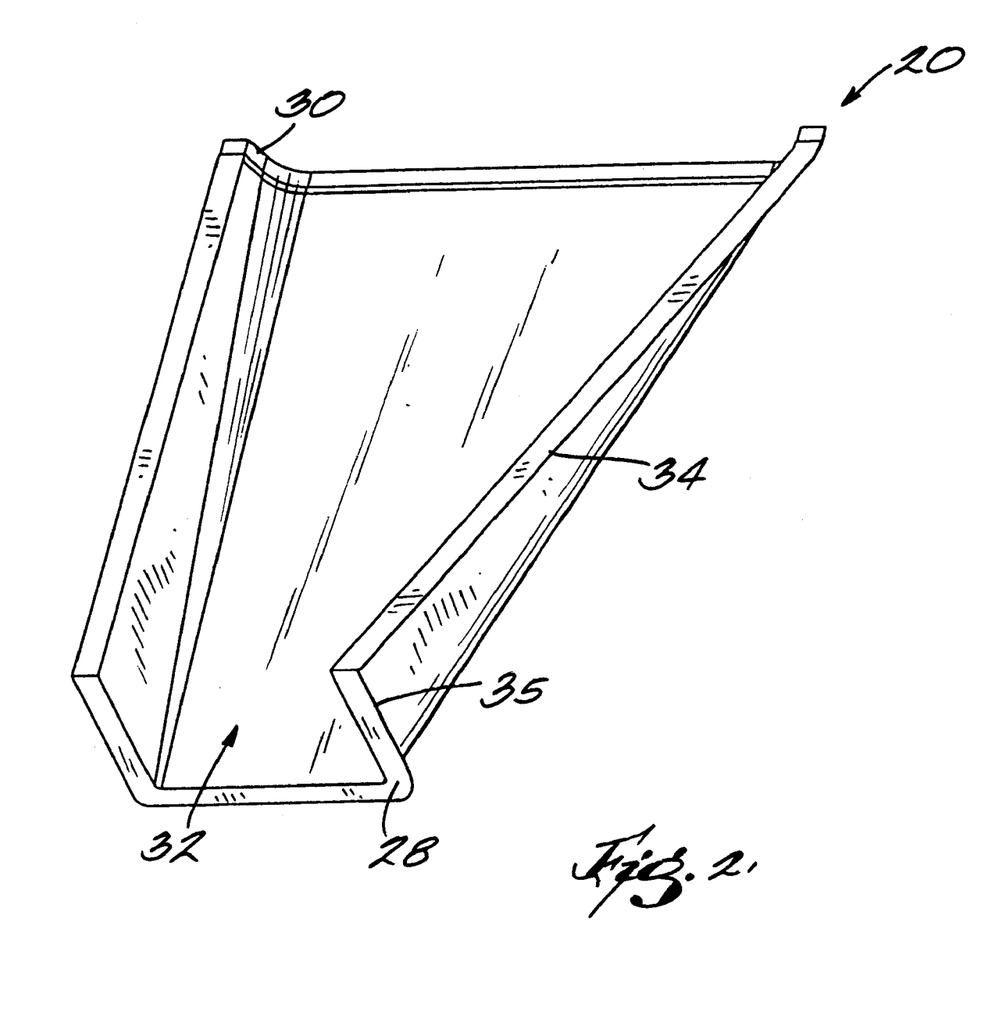
FIG. 2 is a perspective view of a transition section.

FIG. 2 shows transition section 20 from FIG. 1. Transition section 20 includes a front side 28 configured to be coupled to the output of a refrigeration unit, and a rear side 30 configured to be coupled to a duct section 22. Transition section 20 has a substantially U-shaped cross-section, defining a channel 32. As illustrated by FIG. 1 and FIG. 2, fastening transition section 20 to ceiling 18 of trailer 12 forms a conduit for moving air. A lip-like structure 34 may be used to mount transition section 20 to ceiling 18, as will be shown below. Front side 28 also includes a lip-like structure 35 that can be used to mount transition section 20 to the front side 16 of the trailer 12 or to attach transition section 20 to the air outlet of the refrigeration unit 14.

Figure 3:
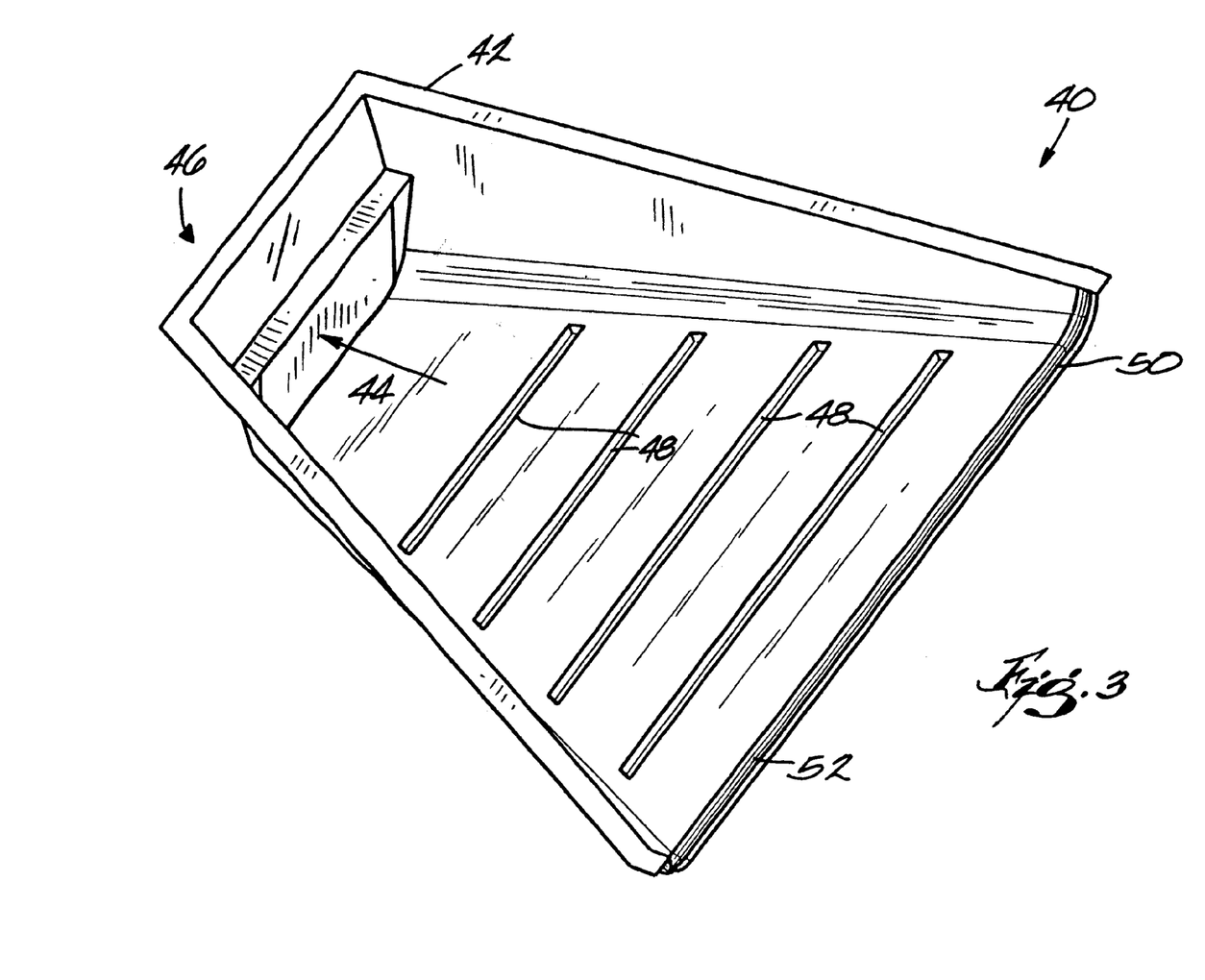
FIG. 3 is a perspective view of a transition section.

Many variations of the dimensions and shape of the transition section are possible. One variation is transition section 40 shown in FIG. 3. Unlike transition section 20 depicted in FIG. 2, transition section 40 includes an extensive lip-like structure 42 that may be used to fasten transition section 40 to ceiling 18. Transition section 40 also includes a front side 46, which defines an opening 44 shaped to conform to the shape of the air outlet of the refrigeration unit 14. Transition section 40 further includes ribs 48 for structural stability. The rear side 50 of transition section 40 includes grooves 52 to enhance the coupling of transition section 40 to a duct section.

In general, the front side of a transition section should be shaped to conform to the air outlet of the refrigeration unit, as well as to the placement of the refrigeration unit on the temperature-controlled cargo container. In addition, the back side of the transition section should be shaped to conform to the duct section to which the transition section will be coupled. The transition section's cross-section need not have corners as depicted in the transition sections 20 and 40 shown in FIGS. 2 and 3, but may be more rounded, giving a substantially C-shaped cross-section. In addition, a transition section may be formed as a fully-enclosed tube, thus forming a self-contained air conduit. A transition section may also include openings to direct some air outward into the enclosure, while conducting most of the air to the duct sections.

Figure 4:
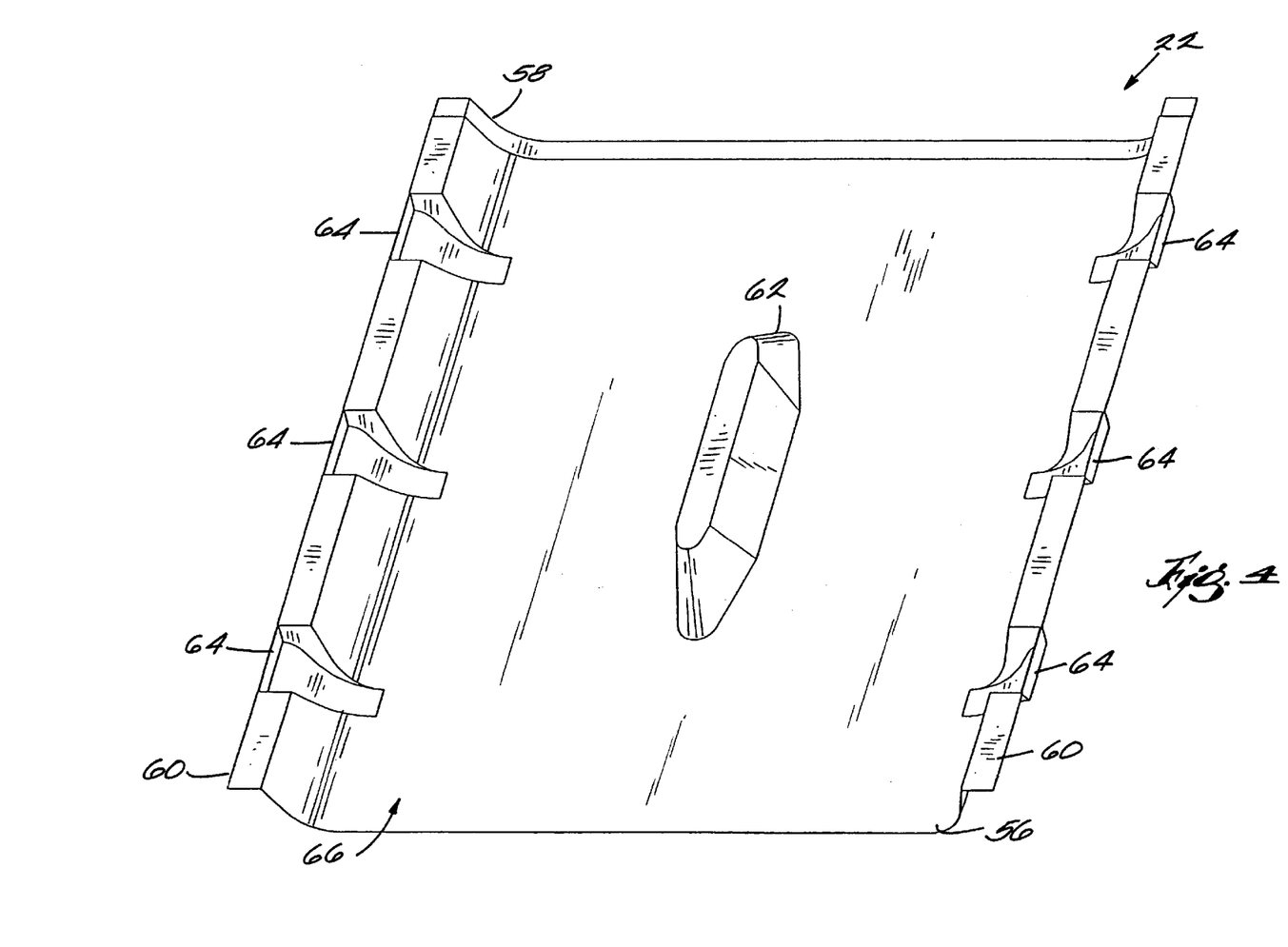
FIG. 4 is a perspective view of a duct section.

FIG. 4 provides a perspective view of a duct section 22 depicted in FIG. 1. Duct section 22 has a front side 56, sized to couple with rear side 30 of transition section 20. Duct section 22 also has a rear side 58, nearly identical to rear side 30 of transition section 20, for coupling to a neighboring duct section or to end section 26. Duct section 22 is formed so that uninstalled duct sections are stackable, that is, capable of being stably stacked with little space between neighboring duct sections in the stack.

As shown in FIG. 1, a plurality of duct sections may be joined to create an air conduit of a desired length. Because the duct sections are substantially identical to each other, a new duct section can be interchanged for a damaged one without discarding the entire duct system 10.

Duct section 22 defines a channel 66, which conducts air entering from front side 56 and discharged at rear side 58. The size of the channel 66 may vary, but a typical channel may be 61 to 65 inches (155 to 165 cm) wide and about 3.5 inches (8.9 cm) deep. Like transition section 20, duct section 22 forms a conduit for moving air when mounted to ceiling 18. Also like transition section 20, duct section 22 includes a lip-like structure 60 that may be used to mount duct section 22 to ceiling 18. Duct section 22 also includes a spacer 62, which prevents duct section 22 from being compressed and restricting the flow of air. Spacer 62 further prevents the loading of tall cargo that may squeeze off the air channel and prevents duct section 22 from being damaged. Spacer 62 can also be used for mounting duct section 22 inside the enclosure of a temperature-controlled cargo container, as will be shown below.

Six lateral air discharge structures 64 are integrally formed with duct section 22. Lateral air discharge structures 64 may be adjusted to create openings through which air may be ejected from the duct system 10 into the enclosure. Each lateral air discharge structure 64 is individually adjustable. The air passing through a lateral air discharge structure 64 tends to flow toward the sides of the enclosure, thus enhancing the distribution of temperature-controlled air throughout the enclosure. Lateral air discharge structures 64 may be implemented in many ways. For example, a lateral air structure 64 may include a thin plastic film covering that may be easily removed by the installer or easily cut to a desired size. Alternatively, lateral air structures 64 may be fitted with plugs or blocks, such as foam pieces that may be used to block or restrict the openings. A third alternative includes sliding, hinged or other closable openings that can be opened to a desired degree.

In a typical installation of a duct system 10, efficient air distribution usually entails creating fewer or smaller lateral discharge openings in the duct sections closest to the refrigeration unit 14, with larger or more numerous lateral discharge openings in those modules farther from the refrigeration unit. In some installations, however, the lateral discharge openings may be kept filly closed near the refrigeration unit 14. An example of such an installation is a trailer divided into two separate enclosures, with the temperature of each enclosure regulated independently. A trailer can be divided into a front enclosure adjacent to the refrigeration unit for holding cargo such as frozen food, and a rear enclosure removed from the refrigeration unit for holding cargo such as produce. In such an arrangement, a single refrigeration unit can often control the temperature of each enclosure by producing two air flows at two different temperatures. The colder air intended for frozen food may be conducted directly into the front enclosure, or may be distributed in the first enclosure by a first small duct system. The warmer air intended for produce may be conducted by a second duct system from the refrigeration unit through the front enclosure to the rear enclosure, with the lateral discharge openings being closed at points where the second duct system passes through the front enclosure.

As with the transition section, many variations of the dimensions and shape of duct section 22 are possible. One variation is the duct section 70 shown in FIG. 5. Duct section 70 has a front side 72 and a rear side 74. Rear side 74 includes grooves 76 to enhance coupling duct section 70 to another duct section or to an end section. Duct section 70 includes a lip-like structure 78 that includes a overhanging surface 78a that may be used to fasten duct section 70 to ceiling 18 in a manner to be described below. Lateral air discharge structures 84 are recessed from overhanging surfaces 78a. Duct section 70 includes a spacer 80, and also includes ribs 82 for additional structural stability. In addition, holes 86 allow draining of moisture such as condensation from the duct section 70.

Figure 6:
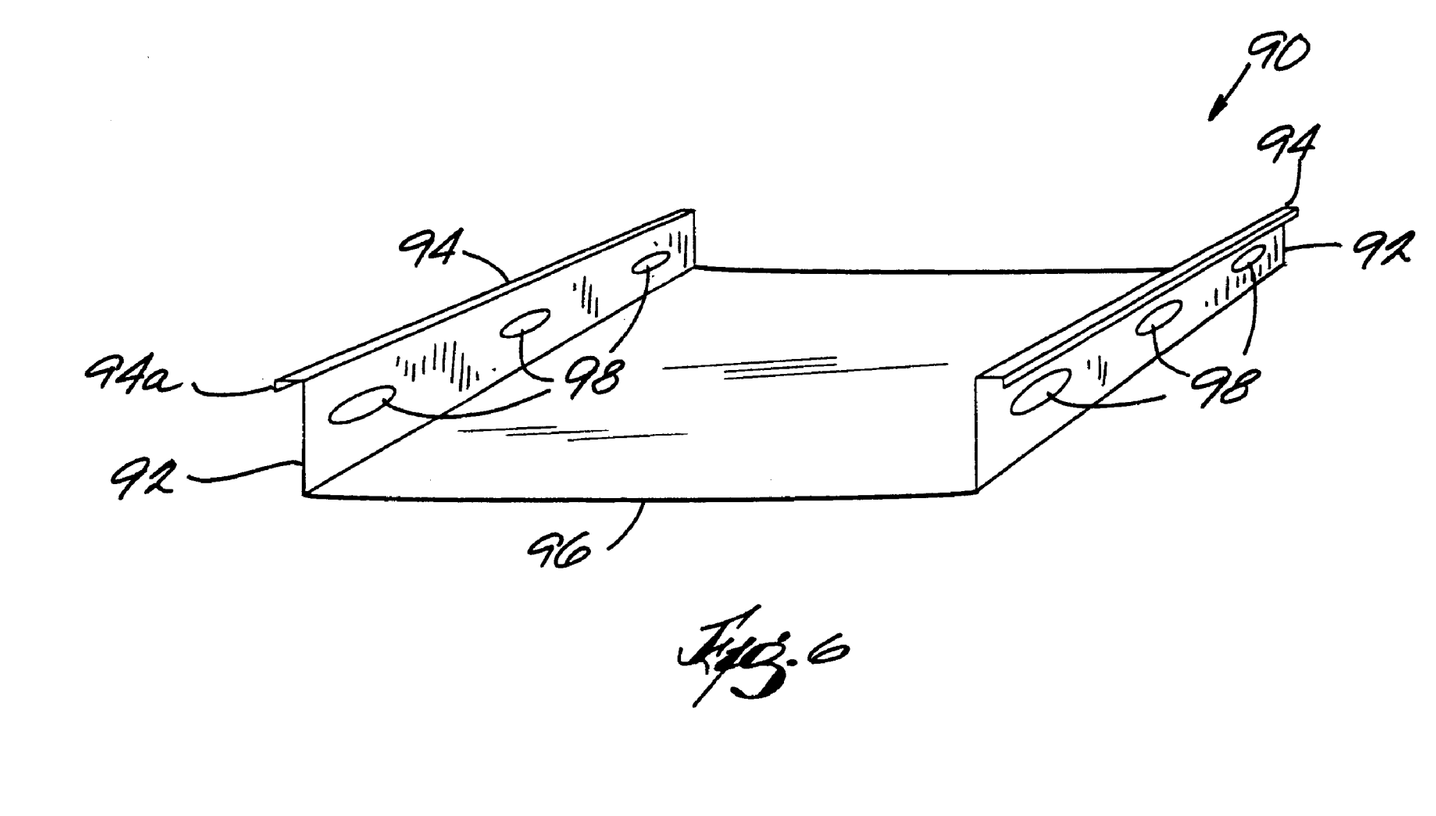
FIG. 6 is a perspective view of a duct section.

Another variation of a duct section 90 is depicted in FIG. 6. Duct section 90 includes sides 92 formed of stiff plastic and which define lateral discharge structures 98. Sides 92 include a lip-like structure 94 and an overhanging surface 94a, which are useful for mounting duct section 90 to ceiling 18. Duct section 90 further includes a bottom 96 formed of a pliable material such as vinyl, which may further include structural members such as wire to maintain shape. Unlike other duct sections 22 and 70, duct section 90 is symmetrical from front-to-back.

Figure 5:
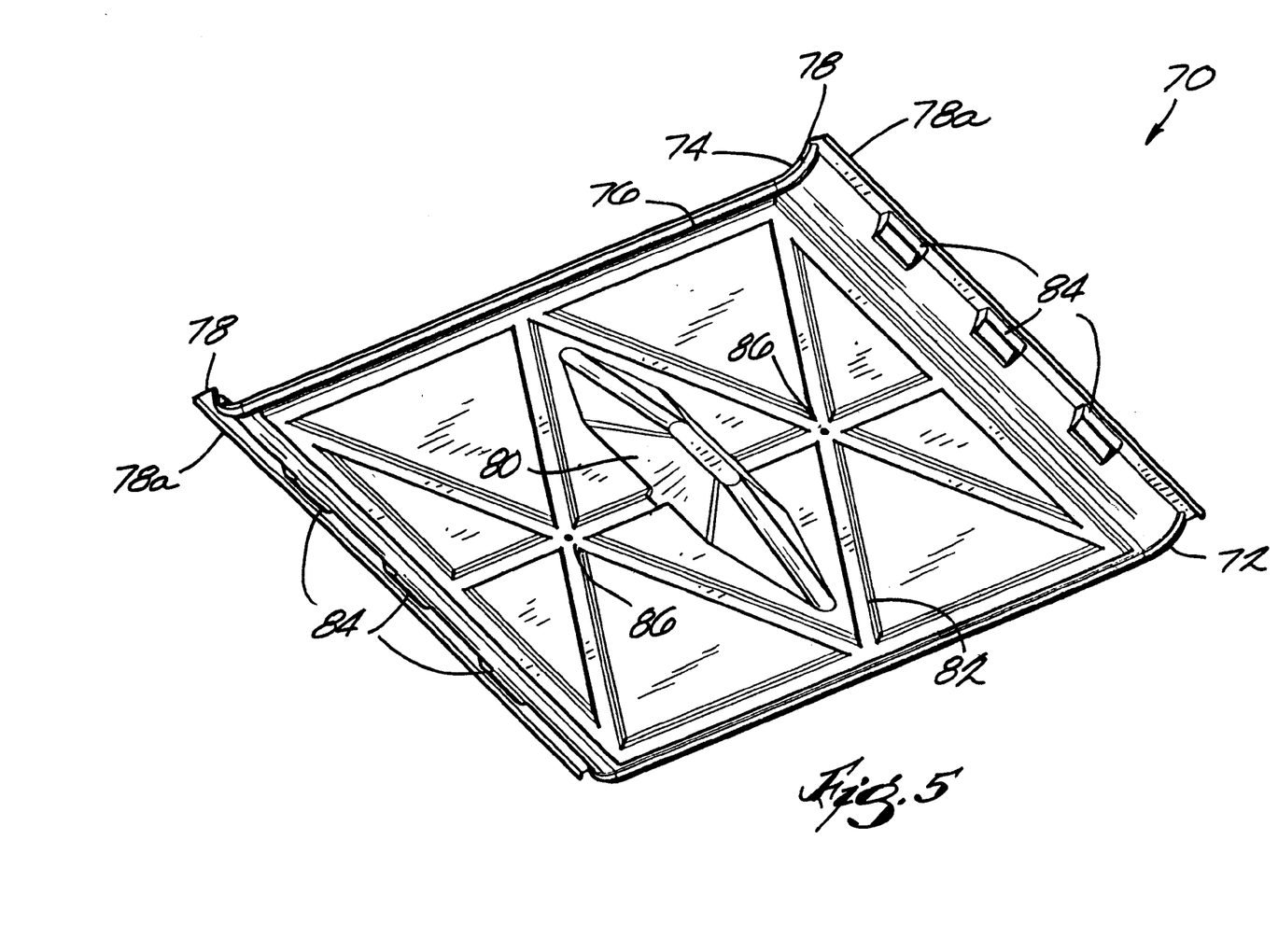

Duct section 90 includes rigid sides 92 and a flexible bottom 96, but a duct section may also be constructed with flexible sides and a rigid bottom. Many other variations are possible. For example, a duct section can be formed as an enclosed tube, thus forming a self-contained air conduit. Spacers of different shapes or a plurality of spacers may be used, or a duct section may include no spacer of any kind. More or fewer lateral air discharge structures may be provided that are shown in FIGS. 4, 5 and 6.

FIG. 7 shows a perspective view of the end section 26 depicted in FIG. 1. End section 26 has a front side 100, sized to couple with rear side 58 of duct section 22, and a rear side 112. End section 26 defines a channel 102 for receiving temperature-controlled air from duct-section 22. Air flows out from end section 26 via lateral air discharge structures 104 and rear air discharge structures 106.

End section 26 is typically installed farthest from refrigeration unit 14. In FIG. 1, end section 26 is installed near the back end 24 of trailer 12. In many temperature-controlled cargo containers such as trailer 12, the refrigeration unit is located away from the doors that offer access to the cargo. When the doors are opened, warm, moist air can enter the enclosure, disturbing the internal temperature of the container and introducing moisture that can freeze on the cargo or on the refrigeration unit. Rear air discharge structures 106 may be configured to direct air downward, creating an "air curtain" between the cargo and the open doors, and reducing the amount of warm air that enters the enclosure.

There are many structural similarities between end section 26 and duct section 22. End section 26 includes a lip-like structure 108 that may be used to fasten end section 26 to ceiling 18. End section 26 includes a spacer 110, which prevents end section 26 from being compressed. The side air discharge structures 104 on end section 26 can be the same as side air discharge structures 64 on duct section 22, and may be implemented in the same ways. Rear air discharge structures 106 can also be implemented in the same ways as the lateral air discharge structures.

Figure 8:
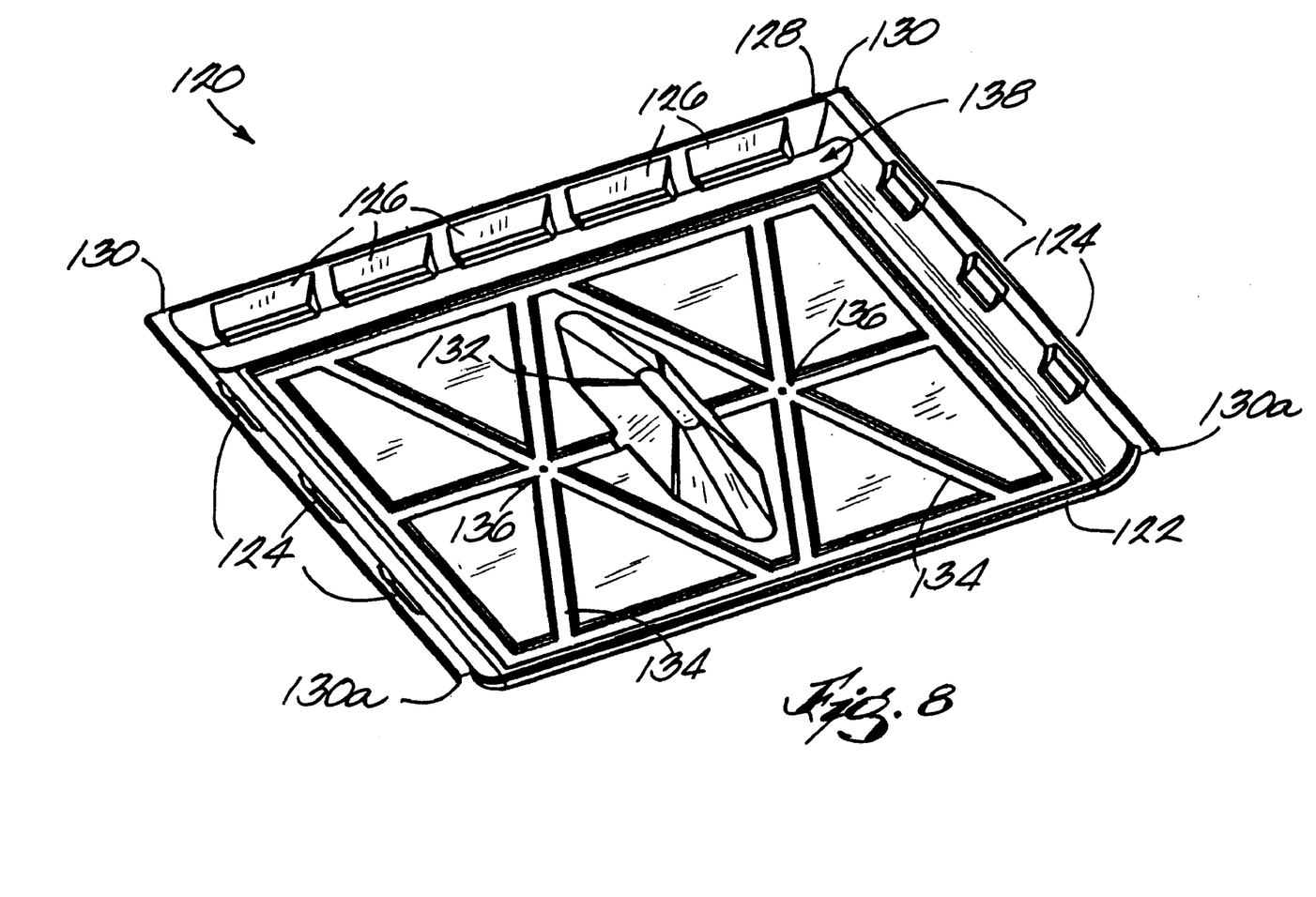
FIG. 8 is a perspective view of an end section.

As with the transition section and the duct section, many variations of the dimensions and shape of the end section are possible. FIG. 8 depicts an end section 120, with a front side 122 and a rear side 128. End section 120 includes a lip-like structure 130 that includes a overhanging surface 130a that may be used to fasten duct section 120 to ceiling 18 in a manner to be described below. Lateral air discharge structures 124 are recessed from overhanging surfaces 130a. End section 120 includes a spacer 132 and ribs 134 for structural stability. Holes 136 allow drainage of moisture such as condensation. End section 120 includes fewer rear air discharge structures 126 than end section 26, but rear air discharge structures 126 on end section 120 are larger and are configured to discharge more air than comparable structures 106 on end section 26.

Figure 9:
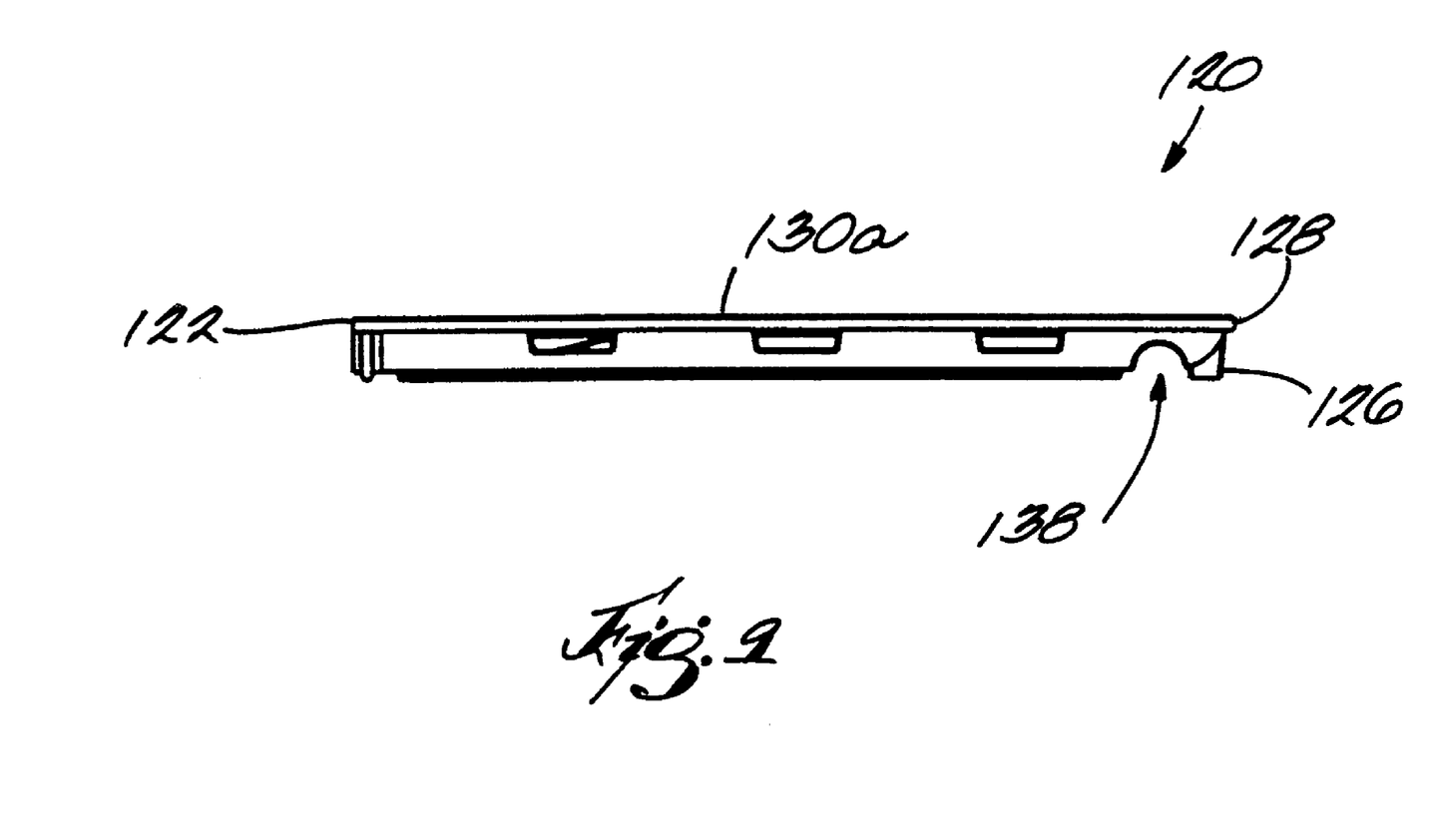
FIG. 9 is a side view of the end section shown in FIG. 8.

End section 120 also includes a concave indentation 138, which is more clearly visible in the side view presented in FIG. 9. As air travels from the front side 122 to the rear side 128, concave indentation 138 cooperates with rear air discharge structures 126 to direct the air downward, creating an air curtain.

Figure 10:
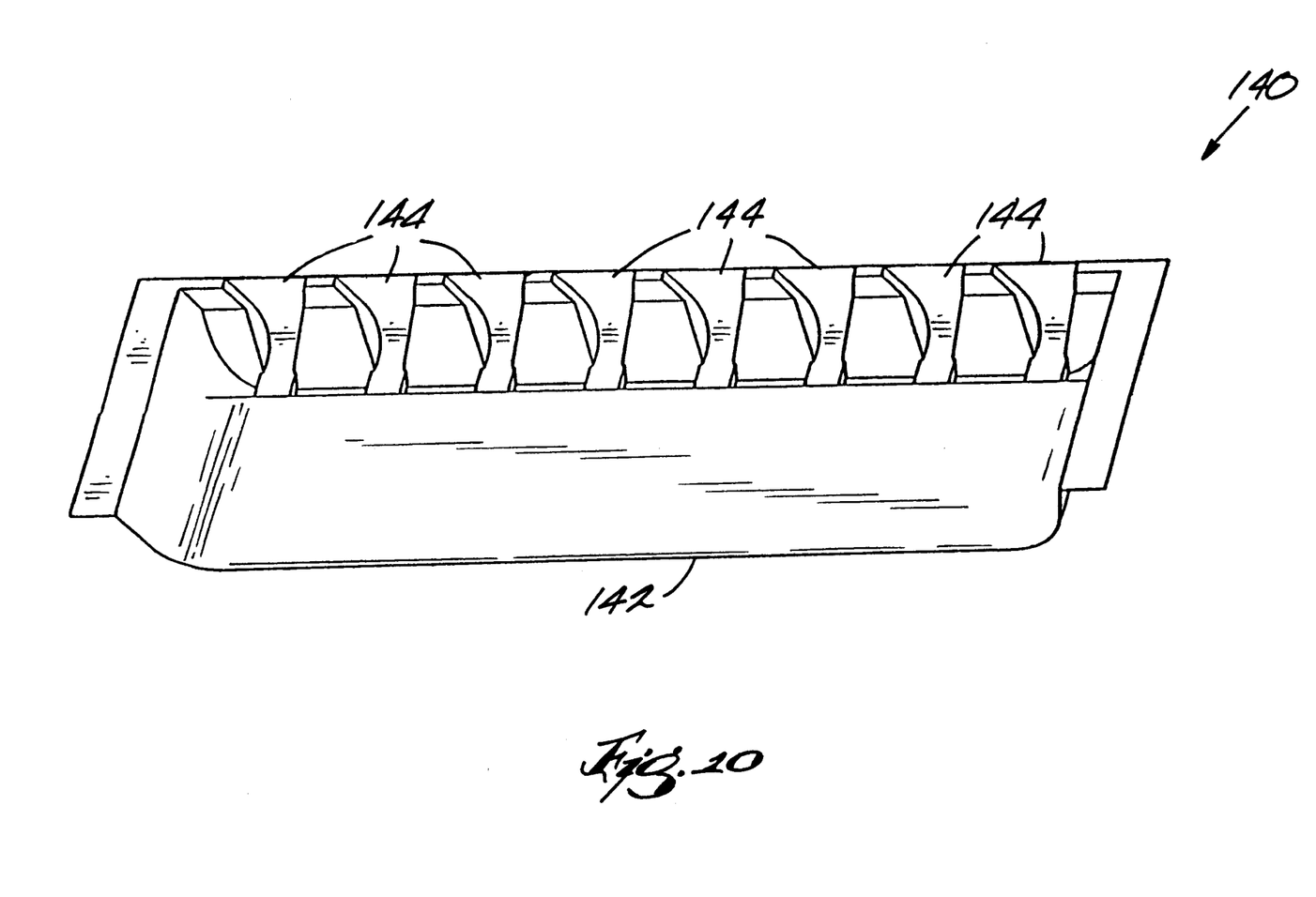
FIG. 10 is a perspective view of an end adapter.

FIGS. 7, 8 and 9 show single-body end sections 26 and 120. An end section can also be constructed by coupling a duct section to an end adapter, such as end adapter 140, as depicted in FIG. 10. End adapter 140 has a front side 142, sized to couple with rear side 38 of duct section 22. Air flows out from end adapter 140 via rear air discharge structures 144. An end adapter employing features of end section 120 shown in FIG. 8 could be used as well.

Figure 11:
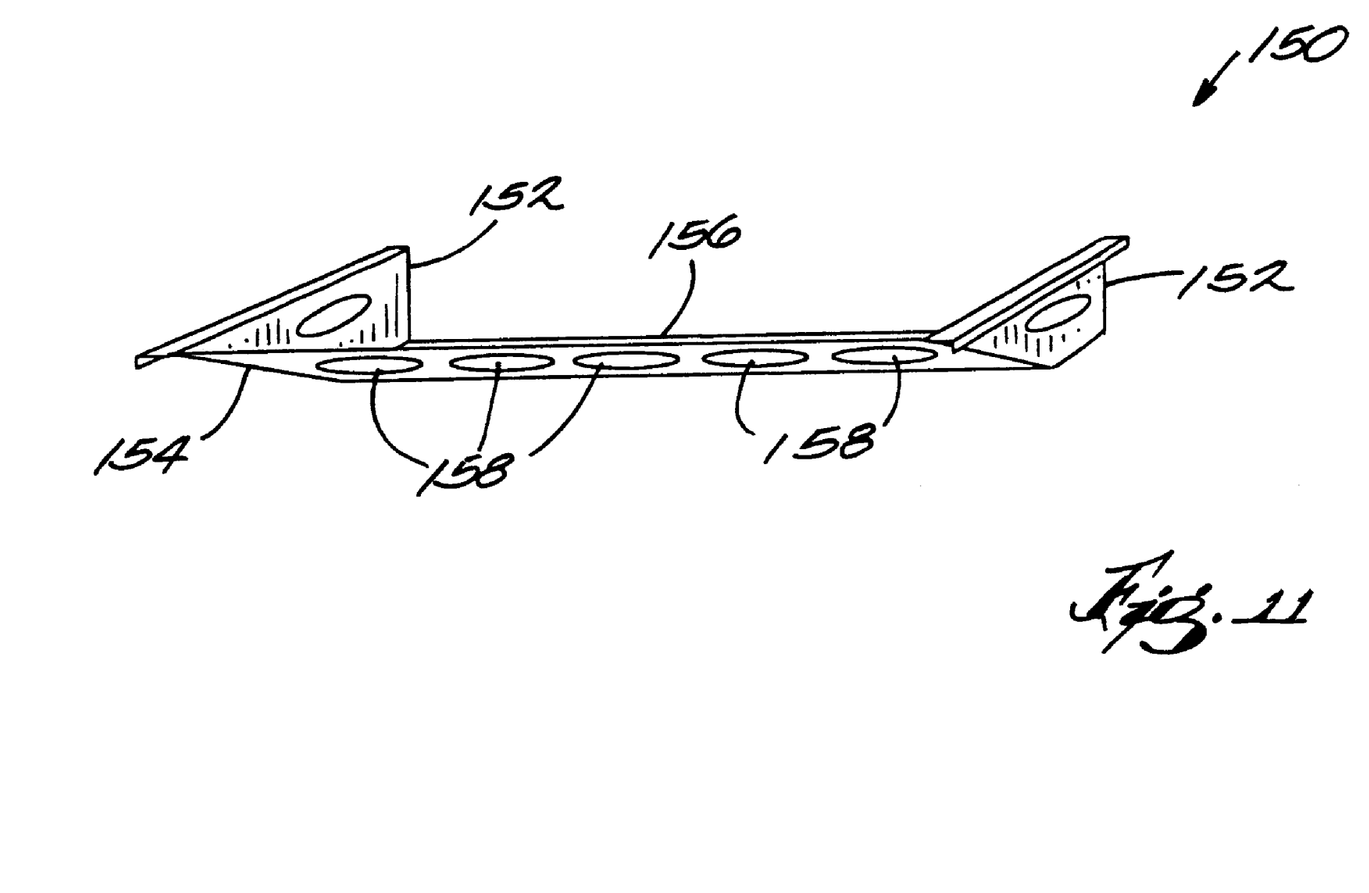

FIG. 11 shows an end adapter 150 configured to couple with duct section 90 shown in FIG. 6. End adapter 150 includes rigid sides 152 and a flexible bottom 156. Rear panel 154, which defines rear air discharge structures 158, may be made of rigid or flexible material. Rear panel 154 is angled to direct air from rear air discharge structures 158 downward, to create an air curtain.

As noted above, the modules of duct system 10 may be constructed of lightweight material such as plastic. In rear-loaded cargo containers, an end section or an end adapter is more likely than the other sections to be struck by cargo. For this reason, it may be desirable to construct an end section or end adapter of more durable impact-resistant material.

Figure 12:
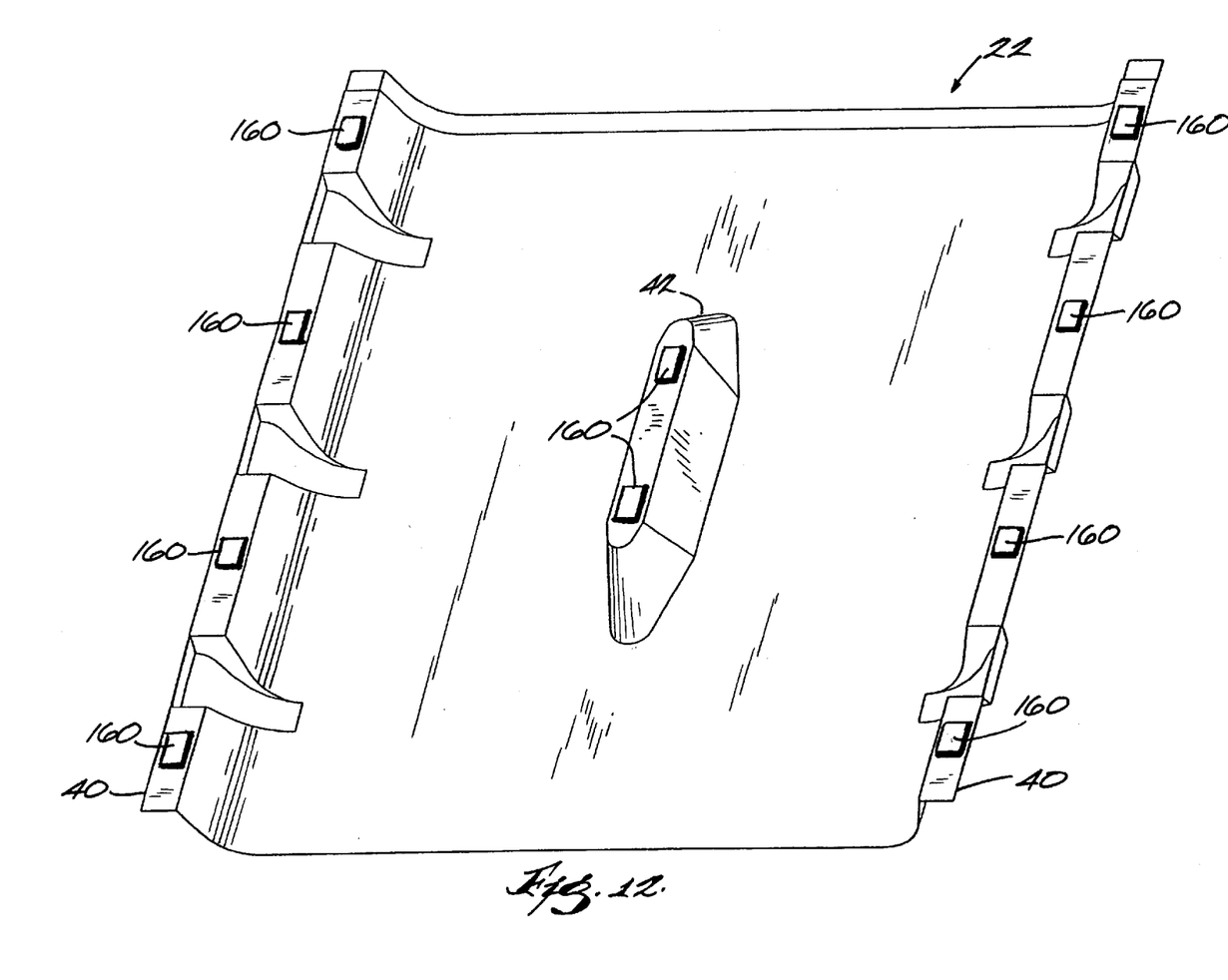
FIG. 12 is a perspective view of a duct section with fasteners.

Duct system 10 can be removably mounted to a ceiling of a cargo container in many ways. One way is to employ adhesive backed fasteners 160, as shown in FIG. 12 applied to a duct section 22. Adhesive-backed fasteners 160 are applied to the lip-like structure 40. When pressed against the ceiling, adhesive backed fasteners 160 hold duct section 22 to the ceiling. Similar fasteners may be applied to lip-like structures of a transition section and to lip-like structures and spacer of an end section. A marking tool such as a chalk line can be used to mark the planned location of duct system 10. To install the system, the installer presses a transition section into position, followed by one or more duct sections and an end section, using the chalk line as a guide. Duct system 10 need not be fastened to the ceiling 18 with an airtight seal. This mounting approach allows the duct system 10 to be installed and removed quickly and economically.

Duct system 10 may be removably mounted with other fasteners, such as snap lock fasteners or hook-and-loop fastener such as Velcro®. Duct system 10 may also be affixed to the ceiling 18 by engagement with a track system mounted on the ceiling.

Figure 13:
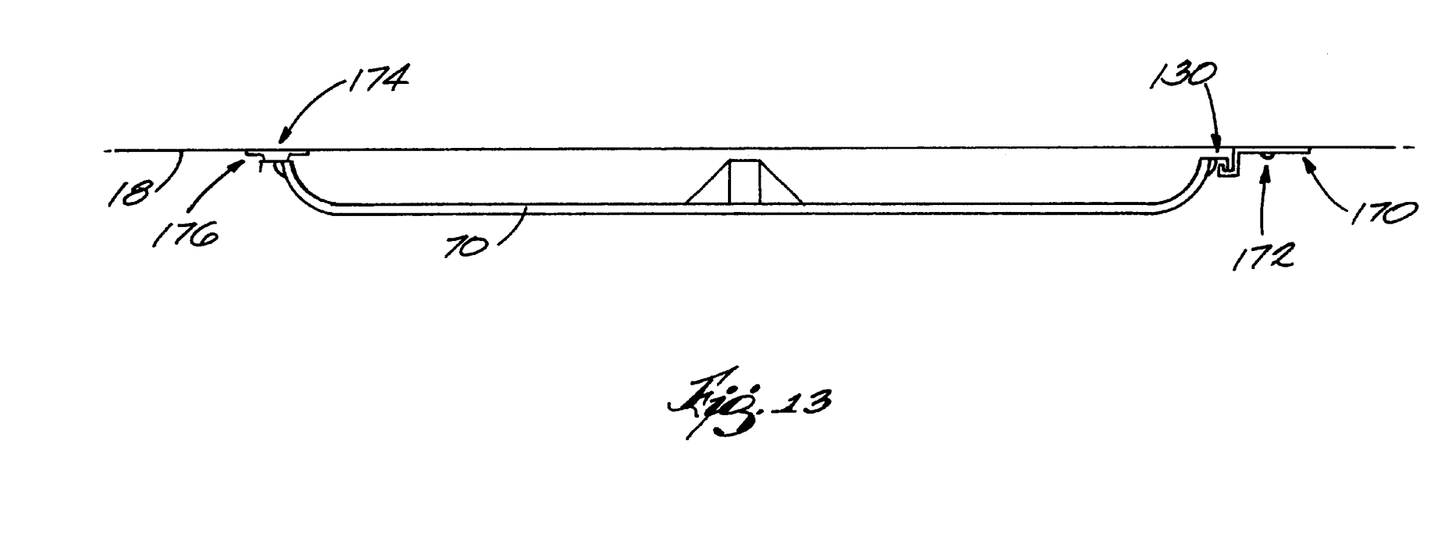
FIG. 13 is a side view of a mounted duct section.

A non-permanent mounting arrangement that combines different forms of fasteners is shown in FIG. 13. A track 170 affixed to the ceiling 18 by means such as a screw 172 holds one side of the duct section 70. The track 170 is configured to engage the lip-like structure 130 of one side of the duct section 70. The opposing side of the duct section 70 is mounted to the ceiling 18 with a removable fastener. In FIG. 13, the fastener is a hook-and-loop fastener, with one component of the fastener 174 affixed to the ceiling 18 and the mating component 176 affixed to the duct section 70. With the combination of the track 170 and the hook-and-loop fastener 174, 176, duct section 70 is mounted to ceiling 18. This arrangement allows for easy installation of the duct system. The installer engages the lip-like structure of one side of each duct section 70 with the track 170, and swings up the opposing side of the duct section swings up to bring together the mating components of the fastener 174, 176. The mounting is non-permanent, and removal of the duct system is easy as well.

An installer may choose to mount the duct system 10 with fasteners such as screws or bolts, making the system more difficult to mount and to remove. If such fasteners are used, the modules of the duct system may include mounting holes to accommodate the fasteners. Non-permanent mounting is generally more desirable, however, because it permits the system to be more quickly mounted, and also permits easy removal and replacement of damaged modules. In addition, non-permanent mounting allows the entire duct system to be readily removed from the cargo container, which may be useful when the system requires cleaning or if refrigeration of the enclosure is not needed.

A number of embodiments of the invention have been described. These and other embodiments are within the scope of the following claims.

What is claimed is:

1. A temperature-controlled cargo container comprising:
    an enclosure for holding cargo that includes a floor, a ceiling, and a pair of ends generally perpendicular to the floor and ceiling;
    a refrigeration unit mounted at one end of the enclosure that discharges temperature-controlled air into the enclosure; and
    a modular duct system removably mounted to the ceiling of the enclosure that conducts air from the refrigeration unit throughout the enclosure, the duct system comprising:
        a duct section configured to conduct air;
        a transition section coupled to the refrigeration unit and the duct section that is configured to conduct air from the refrigeration unit to the duct section; and
        an end section coupled to the duct section, the end section configured to conduct air from the duct section and to discharge the air into the enclosure, the end section including a lateral discharge opening to conduct air laterally into the enclosure, and a rear discharge opening to conduct air downwardly toward the floor of the enclosure.

2. The temperature-controlled cargo container of claim 1, wherein the transition section, the duct section, and the end section are constructed of plastic.

3. The temperature-controlled cargo container of claim 1, wherein the duct section includes adjustable lateral discharge openings.

4. The temperature-controlled cargo container of claim 1, further comprising a plurality of duct sections coupled to each other to conduct air.

5. The temperature-controlled cargo container of claim 4, wherein the duct sections are substantially identical to each other.

6. The temperature-controlled cargo container of claim 1, wherein the duct section is mounted near the midline of the ceiling.

7. The temperature-controlled cargo container of claim 1, wherein the duct section defines a channel with a depth of approximately 3.5 inches (8.9 cm).

8. The temperature-controlled cargo container of claim 1, further comprising a fastener to mount the modular duct system to the ceiling.

9. The temperature-controlled cargo container of claim 8, wherein the fastener is selected from the group consisting of adhesive fasteners, bolts, screws and hook-and-loop fasteners.

10. The temperature-controlled cargo container of claim 1, further comprising a track mounted to the ceiling.

11. The temperature-controlled cargo container of claim 10, wherein the duct section includes a first side and an opposing second side, the track configured to support the first side of the duct section.

12. The temperature-controlled cargo container of claim 1, wherein the end section includes a plurality of rear discharge openings that direct air downwardly to the floor to create an air curtain between the end section and the end of the enclosure closest to the end section.

13. The temperature-controlled cargo container of claim 1, wherein the end section includes a concave indentation that cooperates with the rear discharge opening to facilitate directing air downwardly toward the floor of the enclosure.

14. The temperature-controlled cargo container of claim 1, wherein the duct section and the end section each include a spacer that substantially prevents compression of the respective duct section and end section.

15. An apparatus for conducting air in a temperature-controlled cargo container that includes a refrigeration unit, the apparatus comprising a modular duct system capable of being removably mounted on the ceiling of the temperature-controlled cargo container, the modular duct system comprising:
    a duct section configured to conduct air;
    a transition section configured to be coupled to the refrigeration unit of the cargo container and the duct section, and configured to conduct air from the refrigeration unit to the duct section; and
    a track capable of being mounted on the ceiling of the temperature-controlled cargo container, the track configured to support the modular duct system.

16. The apparatus of claim 15, the modular duct system further comprising an end section coupled to the duct section, the end section configured to conduct air from the duct section and to discharge the air into the cargo container.

17. The apparatus of claim 16, wherein the end section includes an adjustable opening to direct discharged air.

18. The apparatus of claim 16, wherein the end section includes a lateral discharge opening to conduct air laterally into the container, and a rear discharge opening to conduct air downwardly, away from the ceiling of the container.

19. The apparatus of claim 16, wherein the end section includes a plurality of rear discharge openings that direct air downwardly, away from the ceiling of the container to create an air curtain between the end section and a portion of the container.

20. The apparatus of claim 19, wherein the end section includes a concave indentation that cooperates with the rear discharge openings to facilitate directing air downwardly, away from the ceiling of the container.

21. The apparatus of claim 15, wherein the transition section and the duct section are constructed of plastic.

22. The apparatus of claim 15, wherein the duct section includes adjustable lateral discharge openings.

23. The apparatus of claim 15, further comprising a plurality of duct sections coupled to each other to conduct air.

24. The apparatus of claim 23, wherein the duct sections are substantially identical to each other.

25. The apparatus of claim 15, further comprising a fastener to mount the modular duct system to the ceiling.

26. The apparatus of claim 25, wherein the fastener is selected from the group consisting of adhesive fasteners, bolts, screws and hook-and-loop fasteners.

27. The apparatus of claim 15, wherein the duct section includes a first side and an opposing second side, the track configured to support the first side of the duct section.

28. The apparatus of claim 15, wherein the duct section includes a spacer that substantially prevents compression of the duct section.

29. An article for use in a duct system for conducting temperature-controlled air in a temperature-controlled cargo container comprising:

a duct section defining a channel; and an adjustable lateral discharge opening;

wherein the air is received at one end of the channel and is discharged at the opposite end of the channel; and wherein the duct section comprises a rigid side member coupled to a flexible bottom member.

30. The article of claim 29, wherein the air is discharged through the adjustable lateral discharge opening.

31. An article for use in a duct system for conducting temperature-controlled air in a temperature-controlled cargo container comprising:

a duct section defining a channel;

an adjustable lateral discharge opening; and an end adapter coupled to the duct section to conduct air from the duct section and to discharge the air into the cargo container;

wherein the air is received at one end of the channel and is discharged at the opposite end of the channel.

32. The article of claim 31, wherein the end adapter includes rear air discharge structures configured to conduct air downwardly, away from the end adapter in the container.

33. An article for use in a duct system for conducting temperature-controlled air in a temperature-controlled cargo container having a floor, a ceiling, and an end extending between the floor and the ceiling, the article comprising:

an end section defining a channel;

at least one rear air discharge structure configured to direct air downwardly toward the floor of the container to create an air curtain between the end section and the end of the container; and wherein the air is received at one end of the channel and is discharged at the opposite end of the channel via the rear air discharge structure.

34. The article of claim 33, further including an adjustable lateral discharge opening.

35. The article of claim 33, wherein the end section is formed of plastic.

36. The article of claim 33, wherein the end section comprises a rigid side member coupled to a flexible bottom member.

37. The article of claim 33, wherein the end section is an adapter configured to be coupled to an end of the duct system.

38. The article of claim 33, wherein the end section includes a concave indentation that cooperates with the at least one rear discharge structure to facilitate directing air downwardly toward the floor of the container.

39. The article of claim 33, wherein the end section includes a spacer that substantially prevents compression of the end section.

* * * * *